Jan. 13, 1942.   A. TOELLE   2,270,122

GENERATOR

Filed Feb. 23, 1939

WITNESS
E. Pitzke

INVENTOR
August Toelle
BY Edwin C. McRae
C. L. Davis
ATTORNEYS.

Patented Jan. 13, 1942

2,270,122

UNITED STATES PATENT OFFICE 2,270,122

GENERATOR

August Toelle, Detroit, Mich., assignor to Ford Motor Company, Dearborn, Mich., a corporation of Delaware Application February 23, 1939, Serial No. 257,783

3 Claims. (Cl. 171—252)

The object of my invention is to provide a generator especially adapted for use in connection with automotive vehicles. One of the results of my invention is that the armature is more efficiently cooled, thereby permitting the generator to be designed for a higher output and thus providing a smaller generator for a desired capacity. This feature is especially desirable for automotive use because the smaller size not only reduces the cost of manufacture but also allows the generator to be better located on the engine.

A further object of my invention is to provide a generator which may be more conveniently assembled. Heretofore in assembling automotive vehicle generators, it has been necessary to connect at least one flexible lead inside of the generator frame after the armature and end plates have been installed in position. This operation is not only eliminated in this design but, due to the fact that the aforementioned connections had to be made through slots in the generator frame, these slots may be reduced in size so as to more efficiently cool the armature, as will later be disclosed.

A further object of my invention is to provide a generator having an improved brush holder therein. My improved brush holder supports the generator brushes in such a manner that vibration of the brushes is resisted and consequently the generator is considerably quieter in operation than heretofore available generators.

Still a further object of my invention is to provide a generator in which the one end of the field winding is grounded by means of an improved clip device. With this clip, the use of ground clamps and the like is eliminated.

With these and other objects in view, my invention consists in the arrangement, construction and combination of various parts of my improved device, as described in the specification, claimed in my claims, illustrated in the accompanying drawing, in which:

Figure 1:
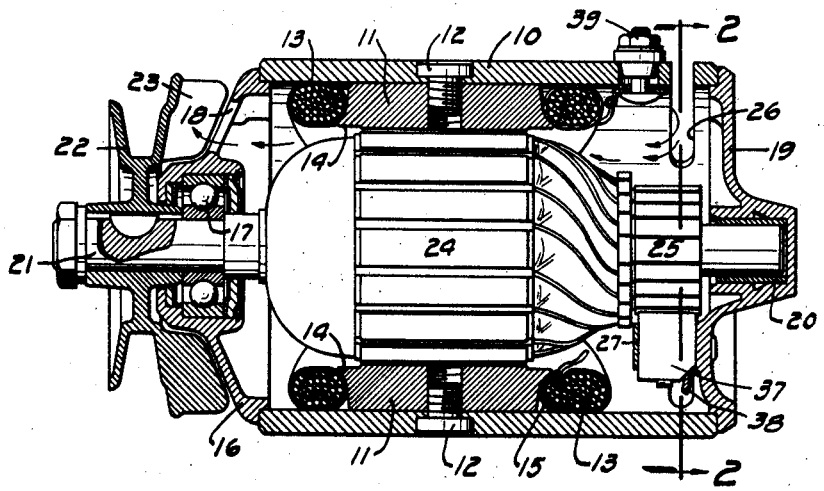
Figure 1 is a longitudinal central sectional view through my generator construction.

Referring to the accompanying drawing, I have used the reference numeral 10 to indicate a generator frame consisting of a cylindrical steel tube having a pair of diametrically opposed pole pieces 11 secured therein by means of screws 12. A pair of field coils 13 are held in position around the respective pole pieces 11 by means of ears 14 which extend from the ends of each pole piece 11. A metallic clip 15 is crimped around one of the field coils 13, the inner end of the coil being electrically connected to the clip 15. When the pole piece 11 is tightened against the inside surface of the frame 10, one of the ears 14 squeezes the clip 15 against the frame 10, thereby making a permanent electrical connection between the frame 10 and clip 15 and thus grounding the inner end of the field coil.

A generator head 16 is secured over one end of the frame 10, the head being provided with a hub portion at the center in which a ball bearing assembly 17 is secured. An annulus of openings 18 is provided in the head 16 through which air is forced to cool the generator.

A brush holder plate 19 is secured over the other end of the frame 10, which plate is also provided with a hub at its center portion in which a plain bearing 20 is mounted. Conventional tie bolts 40 extend through the plate 19 and between the coils 13 and are threaded into the head 16 to fasten the head 16 and plate 19 to the frame. An armature shaft 21 is mounted upon the bearings 17 and 20 in the conventional manner, and a combined fan and pulley 22 is secured to the end of the shaft 21 adjacent to the outside face of the head 16 so that the generator may be rotated by a belt from a rotating part of the vehicle engine. Radially extending vanes 23 are cast upon the pulley 22 so that upon rotation of the pulley these vanes draw air through the openings 18 and discharge same radially from the generator.

An armature 24 is fixed upon the shaft 21 between the bearings 20 and 17, the armature having a conventional commutator 25 affixed thereto adjacent to the plate 19. The armature just described, extends substantially the full distance between the plate 19 and head 16, with the magnetic portion thereof being in alignment with the pole pieces 11.

Figure 2:
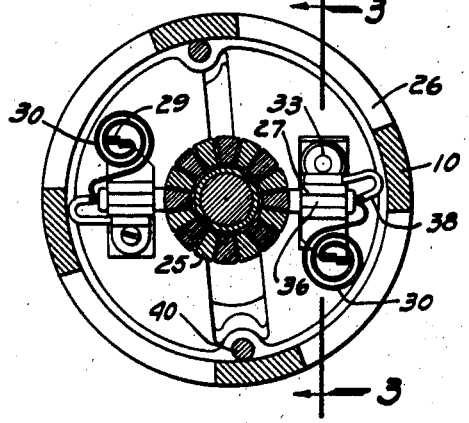
Figure 2 is a sectional view, taken upon the line 2—2 of Figure 1.

It will be noted from Figures 1 and 2 that four relatively narrow slots 26 are punched in the frame 10, these slots being equally spaced around the periphery of the frame and being located in substantial radial alignment with the outer end of the commutator 25. These slots are purposely made narrow. The air entering through the slots 26, because of the vacuum produced by the vanes 23, attains a relatively high velocity so that due to inertia the air will be forced inwardly against the commutator. The air strikes against the commutator and follows along the wiring of the armature before it is exhausted through the openings 18.

The above-mentioned result is only made possible because of the jet effect produced by the relatively narrow slots 26. In the conventional generator such narrow slots cannot be provided because they must be wide enough so that the person assembling same may insert his fingers into the frame and fasten certain conductors after the plate 19 and head 16 are assembled in position. As will be later described, the fastening of such conductors is dispensed with in my improved generator and consequently I am able to provide slots 26, the sole purpose of which is to inject the air inwardly against the commutator to better cool same.

In such generators, the temperature of the commutator is the limiting factor as the generator may be operated up to the temperature at which the solder connecting the armature windings with the commutator bars becomes sufficiently fluid to be thrown off by the centrifugal force of the armature. It is therefore of utmost importance that the heat be conducted away from the commutator and adjacent ends of the armature windings as rapidly as possible. Due to the improved cooling of the commutator of my generator more current may be safely generated in a given size armature winding than has heretofore been possible.

Figure 3:
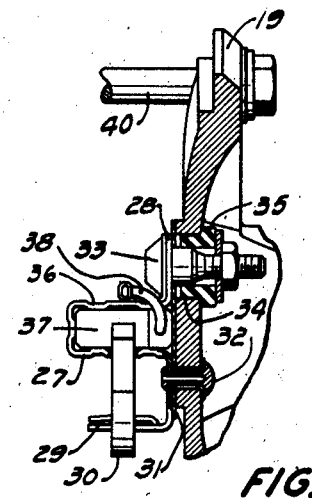
Figure 3 is a full-sized sectional view, taken upon the line 3—3 of Figure 2.

Referring to Figure 3 of the drawing, I have shown my improved brush holder. Two of these brush holders are required, one being electrically as well as mechanically fastened to the plate 19 while the other is fastened in position diametrically opposed therefrom and insulated from the plate. The insulated brush holder is shown more fully in Figure 3, from which it will be noted that the brush holder comprises a strip 27 of sheet metal which has been bent to an S-shape with an ear 28 projecting from the upper end thereof. The lower end of the strip 27 is split, as at 29, so that the center portion of a spiral spring 30 may be inserted between the split portions to thus anchor the spring. The ends of the split portion are bent together to prevent removal of the spring. A strip of insulation 31 is inserted between the strip 27 and the plate 19, and a tubular rivet 32 fastens the lower portion of the brush holder to the plate member. The rivet is suitably insulated from the plate.

A terminal screw 33 is inserted through a suitable opening in the ear 28, which screw extends through an opening 34 in the plate 19. An insulating bushing 35 is disposed between the terminal screw and the plate 19 to prevent conduction of current therebetween. When the screw 33 is tightened in place, a rigid rectangular shaped brush receiving portion is formed by the upper end of the S-shaped strip 27. As this brush holder is anchored by both the terminal screw 33 and the rivet 32, very little vibration can occur. An important feature of this brush holder is that guide members 36 are coined in the sides and ends of the rectangular shaped brush chamber, which guides extend the full width of the brush holder. A rectangular shaped carbon brush 37 is reciprocally mounted between the guides 36 so that the only contact between the brushes and the brush holder is through these guide members. A flexible lead 38 extends from the brush 37 to the screw 33 so that the current picked up by the brush will be conducted to the terminal with practically no voltage drop. The torsional springs 30 resiliently urge the brushes inwardly against the commutator.

The most important feature of my generator is the ease with which it may be assembled or taken apart, it being unnecessary to fasten or remove any electrical connections. As has been mentioned, this permits the slots 26 to be designed for more efficient cooling of the commutator rather than as a means for giving access to the interior of the frame.

Figure 4:
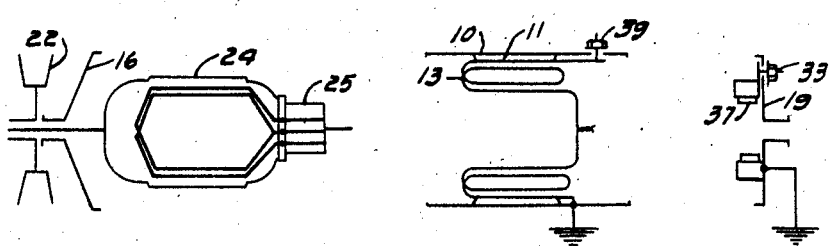
Figure 4 is a diagrammatic view, illustrating the armature sub-assembly, frame sub-assembly, and brush holder plate sub-assembly, showing how these three sub-assemblies may be put together or taken apart without disconnecting any of the wiring. This is no doubt the most important feature of my invention.

Referring to Figure 4, it will be seen that an armature sub-assembly is formed, which consists of the head 16, pulley 22 and armature 24. A frame sub-assembly is formed of the pole pieces 11, the frame 10, and the coils 13. The inner end of one coil is grounded by means of the clip 15 while the outer end of the other coil is connected to an output terminal 39 which is provided in the frame 10. The other ends of the field coils are twisted together and soldered as shown. Both the armature sub-assembly and the frame sub-assembly may be completed in entirely separate departments. A brush holder sub-assembly is also formed by fastening the brush holders 27 on to the plate 19 and inserting the brushes 37 in position. It is convenient when assembling the generator to only partially insert the brushes into position, allowing the free ends of the springs 30 to bear against the sides of the brushes instead of the outer ends thereof, thereby holding the brushes in their outermost positions.

After these three sub-assemblies have been independently made, no further electrical connections of any kind need be made. To make the final assembly it is only necessary to insert the armature into one end of the frame assembly and then place the brush holder plate assembly over the other end of the frame. The free ends of the springs 30 are snapped out against the outer ends of the brushes to resiliently urge them against the commutator. The tie bolts 40 are then threaded in place to complete the final assembly.

Among the many advantages arising from the use of my improved generator construction, it may be well to mention that obviating the need of fastening terminals in place after the generator has been assembled is a factor which materially contributes to the utility of the device. It is only because of this feature that the ventilating slots may be made sufficiently narrow to inject the air inwardly against the commutator, thereby more effectively cooling the same, and it is only due to the improved cooling obtained with this construction that the applicant's generator may be operated to deliver a normal current output fully 30% higher than would be possible with the same temperature rise, using the conventional method of ventilating. When the conventional openings in the brush holder plate are relied upon to admit air to cool the commutator, the air is directed away from the commutator by the rotation of the armature and does not effectively conduct the heat from the commutator bars. Providing larger openings in the end plate for conducting the air in through the conventional generator does not help because the greatest restriction occurs between the armature and the pole pieces. There is a relatively small space between the adjacent edges of the field coils through which the major portion of the cooling air must be forced.

The applicant believes that he has provided a more effective way of cooling the commutator with the limited amount of air available by directing the air inwardly in a radial direction at a relatively high velocity so that inertia will carry the air against the commutator segments and thereby more efficiently cool same. The advantage of this construction is that each vehicle requires a certain generator output for satisfactory operation and with this type of generator, a smaller unit may be employed than would be possible with the conventional type of generator.

Another important advantage is that the generator may be assembled in three distinct sub-assemblies which may be later put together with less labor than heretofore was required. This feature is of especial importance where the generator is to be taken apart for inspection in service. My improved generator may be taken apart and assembled in only a few minutes while with all other generators a considerable time is necessary to do this work.

A further advantage of the construction is that my improved brush holder more rigidly supports the brushes upon the backing plate. Further, by splitting one end portion of the brush holder, the brush spring may be held in position effectively without the use of slotted studs and the like which it has been customary heretofore to employ.

Some changes may be made in the arrangement, construction, and combination of the various parts of my improved construction, without departing from the spirit of my invention, and it is my intention to cover by my claims such changes as may reasonably be included within the scope thereof.

I claim as my invention:

1. A generator especially adapted for use on motor vehicles comprising, a tubular frame, said frame having diametrically opposed pole pieces therein with a field winding disposed around said poles, a generator head detachably secured over one end of said frame, a brush holder plate detachably secured over the other end of said frame, said head and plate having aligned bearings therein, an armature shaft rotatably mounted in said bearings, an armature and commutator affixed to said shaft within said frame, a combined driving pulley and fan affixed to said shaft exteriorly of said head, said head having an annulus of openings therein and said fan being so disposed that upon rotation of said pulley air will be drawn through said openings, said frame having a plurality of relatively narrow slots extending therethrough in substantial radial alignment with the commutator of said armature, said slots being sufficiently restricted that air drawn therethrough by said fan will attain sufficient velocity to be injected inwardly against said commutator.

2. A generator especially adapted for use on motor vehicles comprising, a tubular frame, said frame having diametrically opposed pole pieces therein with a field winding disposed around said poles, a head disposed over one end of said frame, a brush holder plate secured over the other end of said frame, an armature shaft rotatably mounted in said head and plate, an armature fixed on said shaft within said frame, a commutator fixed to said armature in position adjacent to said plate, a driving pulley secured to said armature shaft exteriorly of said head, said driving pulley having a centrifugal fan associated therewith, and said head having an annulus of openings therein through which air is drawn by rotation of said pulley and fan, said frame having a plurality of relatively narrow slots extending therethrough in substantial radial alignment with said commutator, said slots supplying the air which is circulated through said frame by said fan and said slots being sufficiently narrow that air entering therethrough is directed inwardly due to its inertia against said commutator.

3. A generator especially adapted for use on motor vehicles comprising, a tubular frame, said frame having diametrically opposed pole pieces therein with a field winding disposed around said poles, one end of said field winding being grounded to said frame and the other of said winding extending outwardly through an insulated terminal in said frame, a generator head detachably secured over one end of said frame, a brush holder plate detachably secured over the other end of said frame, said head and plate having aligned bearings therein, an armature shaft rotatably mounted in said bearings, said shaft extending through said head and having a combined driving pulley and fan secured thereon exteriorly of said head, an armature secured on said shaft within said frame, a commutator on said armature, said head having an annulus of openings therein through which air is drawn upon rotation of said fan, and said frame having a plurality of relatively narrow slots disposed therein in substantial radial alignment with said commutator, the air circulated by said fan being drawn in through said slots and directed thereby inwardly against said commutator, a pair of diametrically opposed brushes mounted upon said plate, one of said brushes being grounded to said plate while the other of said brushes is insulated therefrom, and an insulated terminal extending through said plate in electrical connection with said insulated brush.

AUGUST TOELLE.